Patented Nov. 9, 1948

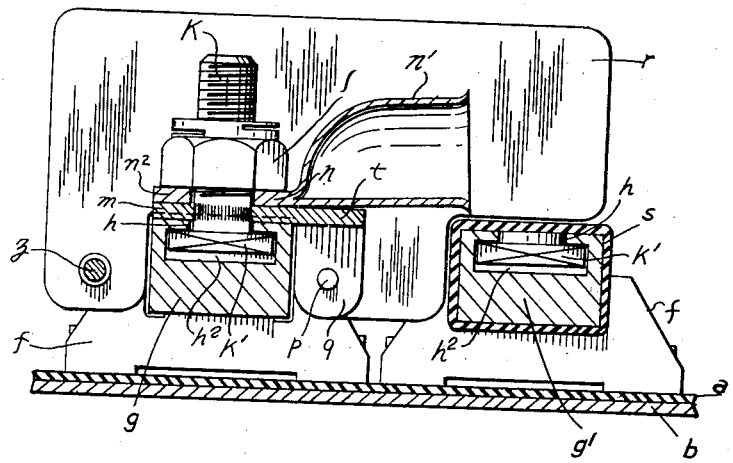

2,453,224

UNITED STATES PATENT OFFICE 2,453,224

BUS BAR AND CONNECTING LINK FOR USE IN ELECTRICAL WIRING SYSTEMS

Walter Edward Hill, Streetly, and Thomas Daniel Guy Wintle, Walsall, England, assignors to J. A. Crabtree & Co. Ltd., Walsall, England, a company of Great Britain Application December 12, 1944, Serial No. 567,800 In Great Britain December 16, 1943

1 Claim. (Cl. 174—59)

This invention relates to improvements in and connected with bus bars for use in junction or connection boxes for electric wiring systems and is more particularly concerned with arrangements for use in systems such as aircraft wiring in which a number of connections are made in a box between cables of different current ratings.

The object of the invention is to provide an improved construction which will enable cable entries to be disposed substantially in the same plane in one or more sides or ends of the box without undesirable crossing of the cables.

According to this invention, cable terminals or sockets are rotationally adjustable on studs slidably mounted along a bus bar secured in a junction box or the like. The bus bar may be formed with a longitudinal groove having undercut formations, the studs having stems extended through the groove and being formed with heads engageable with such formations. This head is preferably of rectangular shape for obtaining non-rotational guidance in the channel formation formed by the undercuts of the grooved bus bar. Each cable terminal may comprise a socket portion for receiving the conductor, and a flat apertured portion adapted to be passed freely over a threaded stem. Alternatively, a cable socket may be provided in accordance with U. S. patent application Serial No. 445,233, now Patent 2,360,304, issued October 10, 1944, for receiving a ferrule on the end of the cable, one of the socket clamp members having an apertured extension adapted to be passed freely over the stem. A nut serves not only for securing the cable terminal or socket but also for clamping the stud in position of adjustment along the bus bar.

The improved arrangement enables the slidable adjustment of the studs along the bus bar and the rotatable positioning of the cable terminals or sockets on the studs so that a large number of conections may be made in a compact space owing to the facility for positioning the cables either transversely or longitudinally of the box, with the cable entries situated either in the sides or ends of the latter.

In order to enable the invention to be readily understood, reference will now be made to the accompanying drawings illustrating, by way of example, one construction for carrying the invention into effect, in which drawings—

Figure 1 is a transverse, vertical sectional view of a pair of spaced, parallel bus bars and related parts, illustrating features of our present invention, Figure 2 is a transverse, vertical sectional view of one of the bus bars illustrated in Figure 1, and Figure 3 is a fragmentary, longitudinal sectional view through a single bus bar and related parts and showing the employment of various types of connectors associated with the bus bar.

Referring to the drawings, an insulating plate $a$ is mounted on a metal support $b$. The blocks $f$ of insulating material are formed with depressed seatings for receiving the ends of the parallelly disposed bus bars, the construction shown comprising two bars $gg^1$ (see Figure 1). Each bar is of rectangular transverse cross-section, and is formed with a longitudinal groove $h$ having undercut formations to provide a channel $h^2$. In its lower wall openings $h^1$, preferably of elongated shape, are provided for the passage of screws $j$ which enter tapped inserts $j'$ in the mounting block $f$ for securing the bus bar in position.

Terminal studs or bolts $k$ adapted to be introduced in a lateral direction into the bus bar, have their threaded stems extended upwardly through the slot in the bar and are slidably adjustable along the latter, the heads $k^1$ having non-rotational guidance within the channel $h^2$. Nuts $l$ engageable with the threaded stems, serve for clamping the heads $k^1$ against the undercut formations and also for securing the cable terminals $n$ or cable sockets $v$, to the studs.

Each cable terminal $n$ comprises a hollow portion $n^1$, which is indented into retaining engagement with the stranded conductors, and a flat portion $n^2$ having an opening adapted to be passed freely over the stem of a stud $k$. A washer $m$ is disposed between the base $n^2$ of the terminal $n$ and the bus bar, and is adapted, by tightening up the nut $l$, to be forced into engagement with knurls $o$ on the stem of the stud $k$.

For cables of lower rating, sockets $v$ (see Figure 3) may be provided instead of the cable terminals $n^1$. Each socket $v$ is constructed in accordance with U. S. A. patent application, Serial No. 445,233, for receiving a ferrule $u$ on the end of a cable, and may be constructed either as a single tier or double tier arrangement. The double tier arrangement is shown in detail in Figure 3, and comprises three super-posed stampings or castings $y$, $y^1$, $y^2$ connected by a screw $w$ entering a tapped opening in the lower member $y^2$ which is formed with an extension having a circular opening $v^1$ to enable it to be passed freely over the stem of a stud or bolt $k$ so that it is rotationally adjustable thereon. A compression spring $x$ is operative between the head of the screw and an annular shoulder on the upper member $y$ for providing resilient clamping pressure in the event of inadvertent loosening of the screw. In a single tier arrangement, the middle stamping $y^1$ is omitted, so that the stampings $y$ and $y^2$ are directly clamped together. One or two sockets $n^1$ may be mounted on the stud $k$ together with the socket $v$ as shown, for example, in Figure 3. It will be evident that by slackening the nut $l$, an individual stud can be slidably positioned along a bus bar, while a cable terminal or socket at the end of a bar can be rotated so that the cable lies either in line with the bar or at right angles thereto.

Thus the cable can be entered either through the ends or the sides of the junction box in which the bus bar is mounted, and a large number of interconnections can be made between cables of different ratings in a compact space. For example, the cable terminals secured to the studs at the ends of the bus bars $gg^1$ are arranged so that their cables are entered through opposed ends of the junction box, the remainder of the terminals being disposed so that the entries are in the right hand side of the box.

If desired, transverse shields $r$ may be disposed on each side of the heavy duty cable terminals, and insulating sleeving $s$ may be arranged around the bus bar to which this cable terminal is connected. As shown in Figure 1, the shields are supported by a pin $p$ supported by lugs $q$ depending from an extension $t$ of the washer $m$. A rivetted connection $z$ is also provided between the shields.

We claim:

A junction box including an elongated bus bar of conducting material and substantially rectangular transverse cross-section having a longitudinally-extending channel formed along a face thereof and having an undercut longitudinally-extending channel of greater width than said first-mentioned channel and underlying and communicating therewith, a connecting stud of conducting material and having a stem extending through the first-mentioned channel and a head of a width greater than the width of said first-mentioned channel and disposed within and slidable along said last-mentioned channel, said head having a flat side portion engaging a wall defining one side of said last-mentioned channel, whereby said stud is held against axial displacement and is also held against rotation with respect to the bus bar, a conductor surrounding the projecting end of said stud, and means for clamping said conductor on said stud and for maintaining said stud in position on said bus bar.

WALTER EDWARD HILL.
THOMAS DANIEL GUY WINTLE.

REFERENCES CITED

The following references are of record in the file of this patent:

UNITED STATES PATENTS

| Number | Name | Date |
|---|---|---|
| 589,760 | Tailleur | Sept. 7, 1897 |
| 1,722,622 | Bilz | July 30, 1929 |
| 2,107,412 | Frank | Feb. 8, 1938 |
| 2,216,309 | Bissell | Oct. 1, 1940 |
| 2,360,304 | McLoughlin et al. | Oct. 10, 1944 |

FOREIGN PATENTS

| Number | Country | Date |
|---|---|---|
| 366,912 | Germany | Jan. 13, 1923 |
| 388,925 | Great Britain | Mar. 9, 1933 |